(12) United States Patent
Gansler

(10) Patent No.: US 7,979,179 B2
(45) Date of Patent: Jul. 12, 2011

(54) APPARATUS AND METHOD FOR PITCH STATE ESTIMATION FOR A VEHICLE

(75) Inventor: Michael T. Gansler, Candia, NH (US)

(73) Assignee: Segway Inc., Bedford, NH (US)

( * ) Notice: Subject to any disclaimer, the term of this patent is extended or adjusted under 35 U.S.C. 154(b) by 854 days.

(21) Appl. No.: 11/837,682

(22) Filed: Aug. 13, 2007

(65) Prior Publication Data

US 2008/0161990 A1   Jul. 3, 2008

Related U.S. Application Data

(60) Provisional application No. 60/837,425, filed on Aug. 11, 2006.

(51) Int. Cl.
 *B60G 17/016* (2006.01)
(52) U.S. Cl. .............. 701/38; 701/213; 342/357.11; 318/587
(58) Field of Classification Search .............. 701/38; 318/587, 638; 342/357.11
See application file for complete search history.

(56) References Cited

U.S. PATENT DOCUMENTS

| | | | |
|---|---|---|---|
| 584,127 A | 6/1897 | Draullette et al. | |
| 849,270 A | 4/1907 | Schafer et al. | |
| 2,742,973 A | 4/1956 | Johannesen et al. | 180/8 |
| 3,145,797 A | 8/1964 | Taylor | 180/21 |
| 3,260,324 A | 7/1966 | Suarez | 180/10 |
| 3,348,518 A | 10/1967 | Forsyth et al. | 115/1 |
| 3,374,845 A | 3/1968 | Selwyn | 180/6.5 |
| 3,399,742 A | 9/1968 | Malick | 180/21 |
| 3,446,304 A | 5/1969 | Alimanestiano | 180/9.24 |
| 3,582,712 A | 6/1971 | Blair | 317/13 R |
| 3,626,177 A | 12/1971 | Franke | 246/1 |
| 3,872,945 A | 3/1975 | Hickman et al. | 180/65 R |

(Continued)

FOREIGN PATENT DOCUMENTS

JP            63305082           12/1888

(Continued)

OTHER PUBLICATIONS

Vos, D., Dynamics and Nonlinear Adaptive Control of an Autonomous Unicycle, Massachusetts Institute of Technology, 1989.

(Continued)

*Primary Examiner* — Mark Hellner
*Assistant Examiner* — Helal A Algahaim
(74) *Attorney, Agent, or Firm* — Pierce Atwood LLP

(57) ABSTRACT

An apparatus and method for a pitch state estimator is provided. The pitch state estimator generates a pitch state signal for establishing the orientation used in the control of a ground-traversing vehicle. The vehicle has a support for supporting a load which is preferably a human passenger. In one embodiment, the pitch state estimator includes a pitch sensor connected to the vehicle producing a pitch signal representing an estimate of a pitch angle of the vehicle. The pitch angle is associated with a coordinate system referenced to gravity. The pitch state estimator also includes at least one inertial reference sensor connected to the vehicle producing an inertial orientation signal with respect to the vehicle. Further included is a state estimator module for receiving the pitch signal and the inertial orientation signal and calculating a pitch state signal from the inertial orientation signal and the pitch signal sensor. The pitch state signal is provided to a control loop of the vehicle for dynamically maintaining stability of the vehicle.

15 Claims, 6 Drawing Sheets

U.S. PATENT DOCUMENTS

| | | | | |
|---|---|---|---|---|
| 3,876,025 | A | 4/1975 | Green | 180/21 |
| 3,952,822 | A | 4/1976 | Udden et al. | 180/21 |
| 3,984,748 | A | 10/1976 | Sullivan | 318/648 |
| 4,019,602 | A | 4/1977 | Habiger | 180/101 |
| 4,050,533 | A | 9/1977 | Seamone | 180/6.5 |
| 4,094,372 | A | 6/1978 | Notter | 180/1 G |
| 4,109,741 | A | 8/1978 | Gabriel | 180/21 |
| 4,151,892 | A | 5/1979 | Francken | 180/77 H |
| 4,212,443 | A | 7/1980 | Duncan et al. | 244/177 |
| 4,222,449 | A | 9/1980 | Feliz | 180/8 A |
| 4,241,931 | A | 12/1980 | Healy | 280/205 |
| 4,244,215 | A | 1/1981 | Merhav | 73/178 R |
| 4,247,127 | A | 1/1981 | Wilkes | 280/28.5 |
| 4,260,942 | A | 4/1981 | Fleming | 318/565 |
| 4,270,164 | A | 5/1981 | Wyman et al. | 363/56 |
| 4,293,052 | A | 10/1981 | Daswick et al. | 180/219 |
| 4,324,414 | A | 4/1982 | Wilkes | 280/242 WC |
| 4,414,937 | A | 11/1983 | Ueda et al. | 123/198 D |
| 4,536,686 | A | 8/1985 | Gartner | 318/434 |
| 4,550,267 | A | 10/1985 | Vaidya | 310/184 |
| 4,560,022 | A | 12/1985 | Kassai | 180/65.1 |
| 4,566,707 | A | 1/1986 | Nitzberg | 180/8.2 |
| 4,607,205 | A | 8/1986 | Kito et al. | 318/778 |
| 4,685,693 | A | 8/1987 | Vadjunec | 280/242 WC |
| 4,709,772 | A | 12/1987 | Brunet | 180/8.2 |
| 4,716,980 | A | 1/1988 | Butler | 180/19.2 |
| 4,796,716 | A | 1/1989 | Masuda | 180/176 |
| 4,797,826 | A | 1/1989 | Onogi et al. | 364/426.04 |
| 4,798,255 | A | 1/1989 | Wu | 180/65.1 |
| 4,802,542 | A | 2/1989 | Houston et al. | 180/65.5 |
| 4,809,804 | A | 3/1989 | Houston et al. | 180/65.5 |
| 4,840,248 | A | 6/1989 | Silverman | 180/272 |
| 4,874,055 | A | 10/1989 | Beer | 180/19.2 |
| 4,919,225 | A | 4/1990 | Sturges | 180/210 |
| 4,964,679 | A | 10/1990 | Rath | 303/100 |
| 4,979,582 | A | 12/1990 | Forster | 180/20 |
| 4,998,596 | A | 3/1991 | Miksitz | 180/213 |
| 5,011,171 | A | 4/1991 | Cook | 280/221 |
| 5,033,000 | A | 7/1991 | Littlejohn et al. | 364/424.05 |
| 5,111,899 | A | 5/1992 | Reimann | 180/65.1 |
| 5,121,806 | A | 6/1992 | Johnson | 180/65.5 |
| 5,168,947 | A | 12/1992 | Rodenborn | 180/19.1 |
| 5,171,173 | A | 12/1992 | Henderson et al. | 440/7 |
| 5,194,872 | A | 3/1993 | Musoff et al. | 342/358 |
| 5,201,382 | A | 4/1993 | Edahiro et al. | 180/197 |
| 5,215,159 | A | 6/1993 | Nishida | 180/179 |
| 5,221,883 | A | 6/1993 | Takenaka et al. | 318/568.12 |
| 5,248,007 | A | 9/1993 | Watkins et al. | 180/9.32 |
| 5,249,636 | A | 10/1993 | Kruse et al. | 180/21 |
| 5,303,156 | A | 4/1994 | Matsuoka et al. | 364/424.05 |
| 5,350,033 | A | 9/1994 | Kraft | 180/167 |
| 5,366,036 | A | 11/1994 | Perry | 180/65.1 |
| 5,376,868 | A | 12/1994 | Toyoda et al. | 318/587 |
| 5,390,753 | A | 2/1995 | Parker | 180/19.1 |
| 5,397,890 | A | 3/1995 | Schueler et al. | 250/221 |
| 5,430,432 | A | 7/1995 | Camhi et al. | 340/438 |
| 5,487,441 | A | 1/1996 | Endo et al. | 180/181 |
| 5,645,135 | A | 7/1997 | Peterson, Jr. | 180/272 |
| 5,670,780 | A | 9/1997 | Lewis | 250/231.14 |
| 5,701,965 | A * | 12/1997 | Kamen et al. | 180/7.1 |
| 5,701,968 | A | 12/1997 | Wright-Ott et al. | 180/65.1 |
| 5,764,014 | A | 6/1998 | Jakeway et al. | 318/587 |
| 5,775,452 | A | 7/1998 | Patmont | 180/181 |
| 5,791,425 | A * | 8/1998 | Kamen et al. | 180/7.1 |
| 5,794,730 | A | 8/1998 | Kamen | 180/7.1 |
| 5,809,755 | A | 9/1998 | Velke et al. | 56/10.8 |
| 5,854,843 | A | 12/1998 | Jacknin et al. | 381/25 |
| 5,860,480 | A | 1/1999 | Jayaraman et al. | 172/2 |
| 5,895,065 | A | 4/1999 | Khomo | 280/221 |
| 5,950,754 | A | 9/1999 | Ondrish, Jr. | 180/181 |
| 5,971,091 | A | 10/1999 | Kamen et al. | 180/218 |
| 5,973,463 | A | 10/1999 | Okuda et al. | 318/430 |
| 5,975,225 | A | 11/1999 | Kamen et al. | 180/7.1 |
| 6,003,624 | A | 12/1999 | Jorgensen et al. | 180/6.5 |
| 6,050,357 | A | 4/2000 | Staelin et al. | 180/65.1 |
| 6,059,062 | A | 5/2000 | Staelin et al. | 180/181 |
| 6,125,957 | A | 10/2000 | Kauffmann | 180/65.1 |
| 6,131,057 | A | 10/2000 | Tamaki et al. | 701/22 |
| 6,170,598 | B1 | 1/2001 | Furukawa | 180/334 |
| 6,205,375 | B1 | 3/2001 | Naito | 701/1 |
| 6,223,104 | B1 | 4/2001 | Kamen et al. | 701/1 |
| 6,246,232 | B1 | 6/2001 | Okumura | 324/207.2 |
| 6,253,143 | B1 | 6/2001 | Silvernagle et al. | 701/93 |
| 6,276,230 | B1 | 8/2001 | Crum et al. | 74/551.9 |
| 6,288,505 | B1 | 9/2001 | Heinzmann et al. | 318/139 |
| 6,302,230 | B1 | 10/2001 | Kamen et al. | 180/171 |
| 6,332,103 | B1 * | 12/2001 | Steenson et al. | 701/1 |
| 6,334,084 | B1 | 12/2001 | Moteki et al. | 701/114 |
| 6,367,817 | B1 | 4/2002 | Kamen et al. | 280/5.507 |
| 6,377,906 | B1 | 4/2002 | Rowe | 702/151 |
| 6,408,240 | B1 * | 6/2002 | Morrell et al. | 701/82 |
| 6,443,250 | B1 | 9/2002 | Kamen et al. | 180/8.1 |
| 6,457,545 | B1 | 10/2002 | Michaud et al. | 180/272 |
| 6,527,071 | B1 | 3/2003 | Villedieu | 180/8.1 |
| 6,538,411 | B1 * | 3/2003 | Field et al. | 318/638 |
| 6,543,564 | B1 | 4/2003 | Kamen et al. | 180/89.13 |
| 6,581,714 | B1 * | 6/2003 | Kamen et al. | 180/333 |
| 6,651,763 | B1 | 11/2003 | Kamen et al. | 180/171 |
| 6,651,766 | B2 | 11/2003 | Kamen et al. | 180/218 |
| 6,759,823 | B2 | 7/2004 | Witzig | 318/434 |
| 6,779,621 | B2 | 8/2004 | Kamen et al. | 180/282 |
| 6,789,640 | B1 | 9/2004 | Arling et al. | 180/282 |
| 6,796,396 | B2 * | 9/2004 | Kamen et al. | 180/272 |
| 6,815,919 | B2 * | 11/2004 | Field et al. | 318/587 |
| 6,827,163 | B2 | 12/2004 | Amsbury et al. | 180/7.1 |
| 6,868,931 | B2 | 3/2005 | Morrell et al. | 180/170 |
| 6,874,591 | B2 | 4/2005 | Morrell et al. | 180/179 |
| 6,965,206 | B2 | 11/2005 | Kamen et al. | 318/139 |
| 7,017,686 | B2 | 3/2006 | Kamen et al. | 180/7.1 |
| 7,275,607 | B2 | 10/2007 | Kamen et al. | 180/7.1 |
| 7,454,290 | B2 * | 11/2008 | Alban et al. | 701/213 |
| 2002/0063006 | A1 | 5/2002 | Kamen et al. | 180/171 |
| 2003/0141832 | A1 * | 7/2003 | Field et al. | 318/139 |
| 2003/0205419 | A1 | 11/2003 | Kamen et al. | 180/21 |
| 2004/0011573 | A1 | 1/2004 | Kamen et al. | 180/7.1 |
| 2004/0055795 | A1 | 3/2004 | Kamen et al. | 180/7.1 |
| 2004/0162683 | A1 | 8/2004 | Verbrugge et al. | 702/64 |
| 2006/0108156 | A1 | 5/2006 | Heinzmann et al. | 180/8.2 |
| 2006/0108165 | A1 | 5/2006 | Kamen et al. | 180/233 |

FOREIGN PATENT DOCUMENTS

| | | |
|---|---|---|
| JP | 01316810 | 12/1989 |
| JP | 4-201793 | 7/1992 |
| JP | 4201793 | 7/1992 |
| WO | WO89/06117 | 7/1989 |
| WO | WO96/23478 | 8/1996 |
| WO | WO98/46474 | 10/1998 |
| WO | WO00/75001 | 12/2000 |

OTHER PUBLICATIONS

Vos, D., Nonlinear Control of an Autonomous Unicycle Robot: Practical Issues, Massachusetts Institute of Technology, 1992.

Yamafuji et al., Study of Postural and Driving Control of Coaxial Bicycle, Paper Read at Meeting of Japan Society of Mechanical Engineering (vol. C), vol. 54, No. 501, pp. 1114-1121 (May 1988).

Yamafuji et al., Synchronization and Steering Control of a Parallel Bicycle, Paper Read at Meeting of Japan Society of Mechanical Engineering (vol. C), vol. 55, No. 513, pp. 1229-1234 (May 1989).

* cited by examiner

APPARATUS AND METHOD FOR PITCH STATE ESTIMATION FOR A VEHICLE

RELATED APPLICATIONS

The present application claims priority to U.S. Provisional Patent Application No. 60/837,425, filed Aug. 11, 2006, which is incorporated herein by reference.

FIELD OF THE INVENTION

The present invention pertains to estimation of orientation of a vehicle for purposes of control of the vehicle, and in particular, estimation of a pitch state of a vehicle.

BACKGROUND OF THE INVENTION

Various methods and devices exist for measuring orientation (e.g., pitch, yaw and roll) of a vehicle. Pitch, denoted as $\theta$, is the angle between a true vertical axis as defined by gravity and a vehicle-fixed substantially vertical axis, denoted as R. R may be defined, for example, by a seat back or another vehicle-fixed structure. Pitch sensing devices include accelerometers, inclinometers, gyroscopes, pendulous reference sensors, also known as tilt sensors, and distance probes.

Single axis state estimators (SASEs), can provide an estimate of the pitch of a vehicle over regular surfaces under most expected conditions. The pitch state becomes inaccurate where the vehicle makes certain changes in direction, such as, turning the vehicle around on a sloped surface. In such a situation, a SASE may indicate that the vehicle still has a positive pitch even though the vehicle is facing downward where the inclinometer should indicate a negative pitch. The sensors saturate if the pitch suddenly changes so that the pitch rate is above the temporal threshold at which the device may measure change.

SUMMARY OF THE INVENTION

The invention, in one aspect, features a computerized method for generating a pitch state signal used in control of a ground traversing vehicle. The method involves deriving three or more digital inertial orientation signals from at least three inertial sensors positioned in three or more non-collinear orientations on the vehicle and calculating a first pitch state signal in a three-axis state estimator module based on the three or more digital inertial orientation signals. The method also involves deriving an additional digital orientation signal from an additional orientation sensor positioned on the vehicle and calculating a second pitch state signal in a single-axis state estimation based on the digital inertial orientation signals and the additional digital orientation signal. The method also involves using the first and second pitch state signals in a first slew logic estimator module providing a pitch state output signal that mediates between an output from the three-axis state estimator module and the single-axis state estimation. The method also involves calculating a first intermediate pitch state signal in a first single-axis estimator based on the digital inertial orientation signals and calculating a second intermediate pitch state signal in a second single-axis state estimator based on the additional digital orientation signal. The method also involves using the first and second intermediate pitch state signals in a second slew logic estimator module to provide the second pitch state signal. In the presence of a fault condition associated with either one or more of the three digital inertial orientation signals or the additional digital orientation signal, the second slew logic estimator module nevertheless provides a single-axis state estimation substantially devoid of discontinuity.

In some embodiments, calculating the first pitch state signal involves transforming the three or more inertial orientation signals into three axial inertial orientation signals so that each signal corresponds to the orientation of one axis of three perpendicular axes. In some embodiments, calculating the first pitch state signal involves transforming the three axial inertial orientation signals into gravity based orientation signals so that each signal corresponds to a gravity based orientation system. In some embodiments, calculating the first pitch state signal involves transforming the three gravity based orientation signals into three angular signals, one signal representative of the first pitch state signal. In some embodiments, calculating the first pitch state involves providing the first pitch state signal to a control loop of the vehicle for dynamically maintaining stability of the vehicle.

In some embodiments, the method involves detecting the presence of a fault condition in response to detecting an error in either at least one of the three or more digital inertial orientation signals or the additional digital orientation signal. In some embodiments, the second slew logic estimator module provides the second intermediate pitch state signal to the first slew logic estimator module in response to detecting an error in at least one of the three or more digital inertial orientation signals. In some embodiments, the second slew logic estimator module provides the first intermediate pitch state signal to the first slew logic estimator module in response to detecting an error in the additional digital orientation signal.

In some embodiments, the first slew logic estimator module provides the second pitch state estimate to a control loop of the vehicle in response to detecting an error in at least one of the three or more digital inertial orientation signals or the first pitch state signal to the control loop of the vehicle in response to detecting an error in the additional digital orientation signal.

In some embodiments, determining if a fault condition is present involves calculating a pitch rate error by passing output signals from the at least three inertial sensors through filters that are configured such that the sum of the output of the filters equals zero when the inertial sensors are operating with no error, summing outputs of the filters, and comparing the sum of the output of the filters to a predefined threshold value determining if a fault condition is present. In some embodiments, the method also involves calculating a pitch angle error by passing the summed output of the filters through an additional summer, integrating the output of the additional summer to produce a pitch angle error, and comparing the pitch angle error to a predefined threshold value determining if a fault condition that cannot be corrected has occurred. In some embodiments, the pitch angle error is corrected by using the pitch angle error as feedback in a pitch state estimator.

The invention, in another aspect, features an apparatus for generating a pitch state signal used in control of a ground-traversing vehicle. The apparatus includes at least three inertial sensors positioned in three or more non-collinear orientations on the vehicle, having outputs by which may be derived three or more digital inertial orientation signals. The apparatus also includes a three-axis state estimator module, having an input coupled to the three or more digital inertial orientation signals, for calculating a first pitch state signal. The apparatus also includes an additional orientation sensor, positioned on the vehicle, having an output by which may be derived an additional digital orientation signal. The apparatus also includes logic for performing a single-axis state estimation of a second pitch state signal based on the digital inertial orientation signals and the additional digital orientation signal. The apparatus also includes a first slew logic estimator module, having an input coupled to the first and second pitch state signals, for providing a pitch state output signal. The first slew logic estimator module mediating between an output from the three-state estimator module and a second slew logic estimator module. The apparatus also includes a first single-axis state estimator module, having an input couple to the three or more digital inertial orientation signals for calculating a first intermediate pitch state signal and a second single-axis state estimator module having an input coupled to the additional digital orientation signal, for calculating a second intermediate pitch state signal. The second slew logic estimator module has an input coupled to the first and second intermediate pitch state signals, and an output coupled to an input of the first slew logic estimator module. In the presence of a fault condition associated with either one or more of the three digital inertial orientation signals or the additional digital orientation signal, the second slew logic estimator module nevertheless provides a single-axis state estimation substantially devoid of discontinuity.

In some embodiments, the apparatus includes at least one inertial sensor that is a gyroscope. In some embodiments, the apparatus includes at least three inertial reference sensors that are gyroscopes. In some embodiments, the apparatus includes a fault detection module for detecting the presence of erroneous inertial orientation signals produced by at least one of the inertial sensors. In some embodiments, the apparatus includes a virtual-gyro construction module for receiving the three or more digital inertial orientation signals of the at least three gyroscopes and outputting to a state estimator module three rotation rate signals, wherein each rotation rate signal represents a rotation rate about one axis of three perpendicular axes.

The invention, in another aspect, features a computerized method for generating an orientation signal used in control of a ground traversing vehicle. The method involves deriving three or more digital orientation signals from at least three inertial sensors positioned in three or more non-collinear orientations on the vehicle. The method also involves calculating a first orientation signal in a three-axis state estimator module based on the three or more digital inertial orientation signals. The method also involves deriving an additional digital orientation signal from an additional orientation sensor positioned on the vehicle and calculating a second orientation signal in a single-axis state estimation based on the digital inertial orientation signals and the additional digital orientation signal. The method also involves using the first and second orientation signals in a first slew logic estimator module providing an orientation output signal that mediates between an output from the three-axis state estimator module and the single-axis state estimation. The method also involves calculating a first intermediate orientation signal in a first single-axis estimator based on the digital inertial orientation signals and calculating a second intermediate orientation signal in a second single-axis state estimator based on the additional digital orientation signal. The method also involves using the first and second intermediate orientation signals in a second slew logic estimator module to provide the second orientation signal. In the presence of a fault condition associated with either one or more of the three digital inertial orientation signals or the additional digital orientation signal, the second slew logic estimator module nevertheless provides a single-axis state estimation substantially devoid of discontinuity.

The first and second orientation signals can be pitch state signals, roll state signals or yaw state signals.

BRIEF DESCRIPTION OF THE DRAWINGS

The foregoing features of the invention will be more readily understood by reference to the following detailed description, taken with reference to the accompanying drawings, in which.

DETAILED DESCRIPTION OF ILLUSTRATIVE EMBODIMENTS

"Pitch state" as used in this description and the appended claims includes both the pitch in the fore-aft plane and the pitch rate of the vehicle, i.e. $\theta$ and $\theta_r$ (or $\dot\theta$) where $\theta_r$ is the time rate of change of $\theta$.

Figure 1:
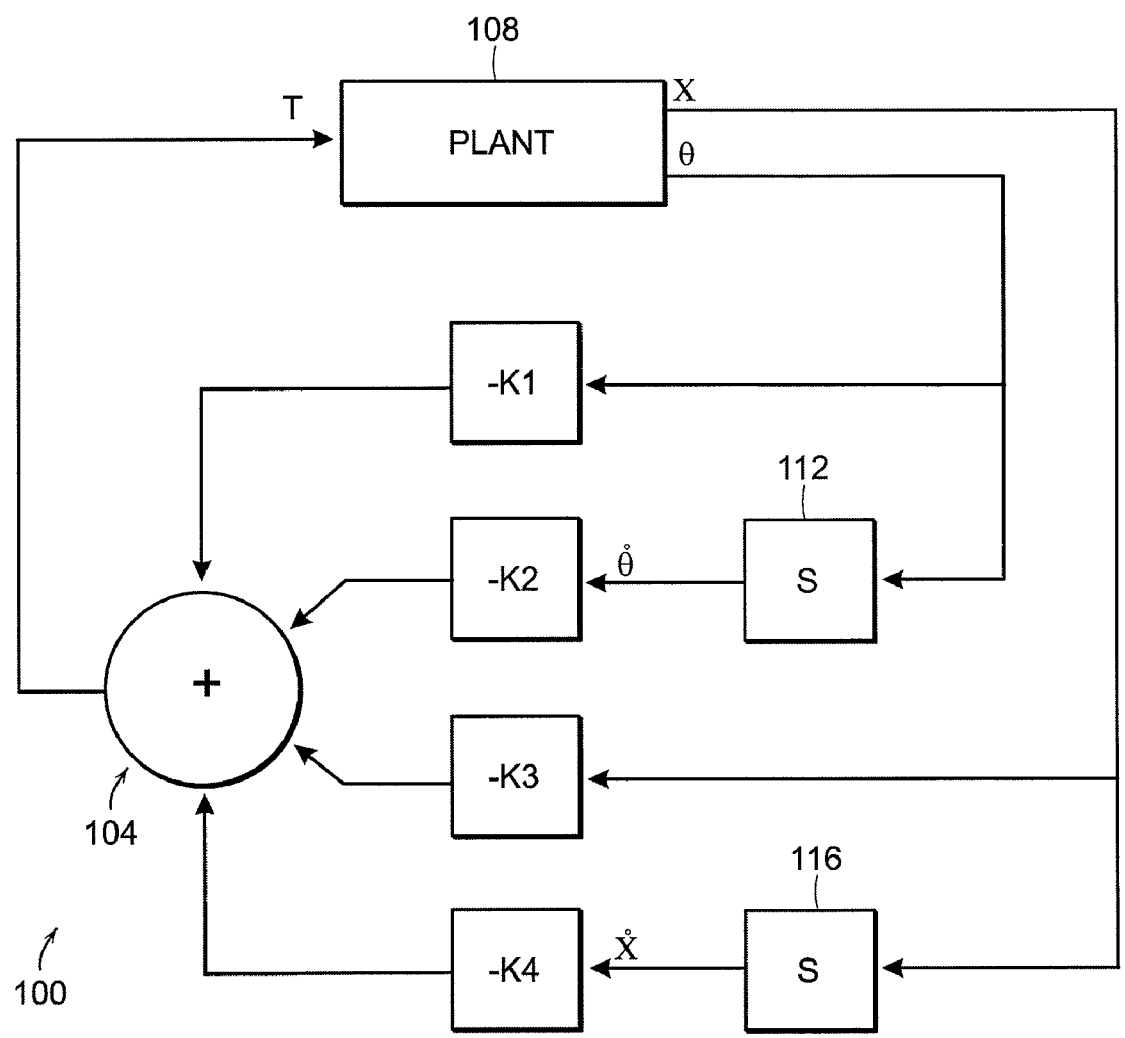
FIG. 1 is a block diagram of a control loop for dynamically controlling the stability of a vehicle in the fore-aft plane.

FIG. 1 shows a control loop 100 for dynamically maintaining stability of a vehicle (plant 108) in the fore-aft plane so that the vehicle remains upright. This control loop 100 requires the pitch state as an input. U.S. Pat. Nos. 5,701,965 and 5,791,425 describe vehicles that can be operated using the control loop 100 of FIG. 1. The vehicles require measurement of instantaneous pitch state for active control of the vehicles' stability. These patents are incorporated by reference herein in their entirety. The plant 108 of FIG. 1 is equivalent to the equations of motion of a locomotion system driven by a single motor. T identifies the wheel torque. Theta ($\theta$) identifies the fore-aft inclination (i.e., the pitch angle), X identifies the fore-aft displacement along a surface relative to a reference point, and the subscript r denotes a variable differential with respect to time. Control gains $K_1$, $K_2$, $K_3$ and $K_4$, differentiators 112 and 116 and a summer 104 are used to achieve balance. To achieve dynamic control and to insure stability of the system, and to keep the system in the neighborhood of a reference point on the surface, the wheel torque T in this embodiment is set to satisfy the following equation:

$$T = K_1\theta + K_2\theta_r + K_3 X + K_4 X_r \quad \text{(EQN. 1)}$$

The values of the gains $K_1$, $K_2$, $K_3$ and $K_4$ are dependent on settings of the control loop, physical parameters of the system, and other effects such as gravity.

The dynamic behavior of a vehicle may be described through reference to a coordinate system. Two such coordinate systems are used in describing the motion of a vehicle about irregular surfaces: the Earth reference frame, "E-frame", and the vehicle reference frame "V-frame".

Figure 2:
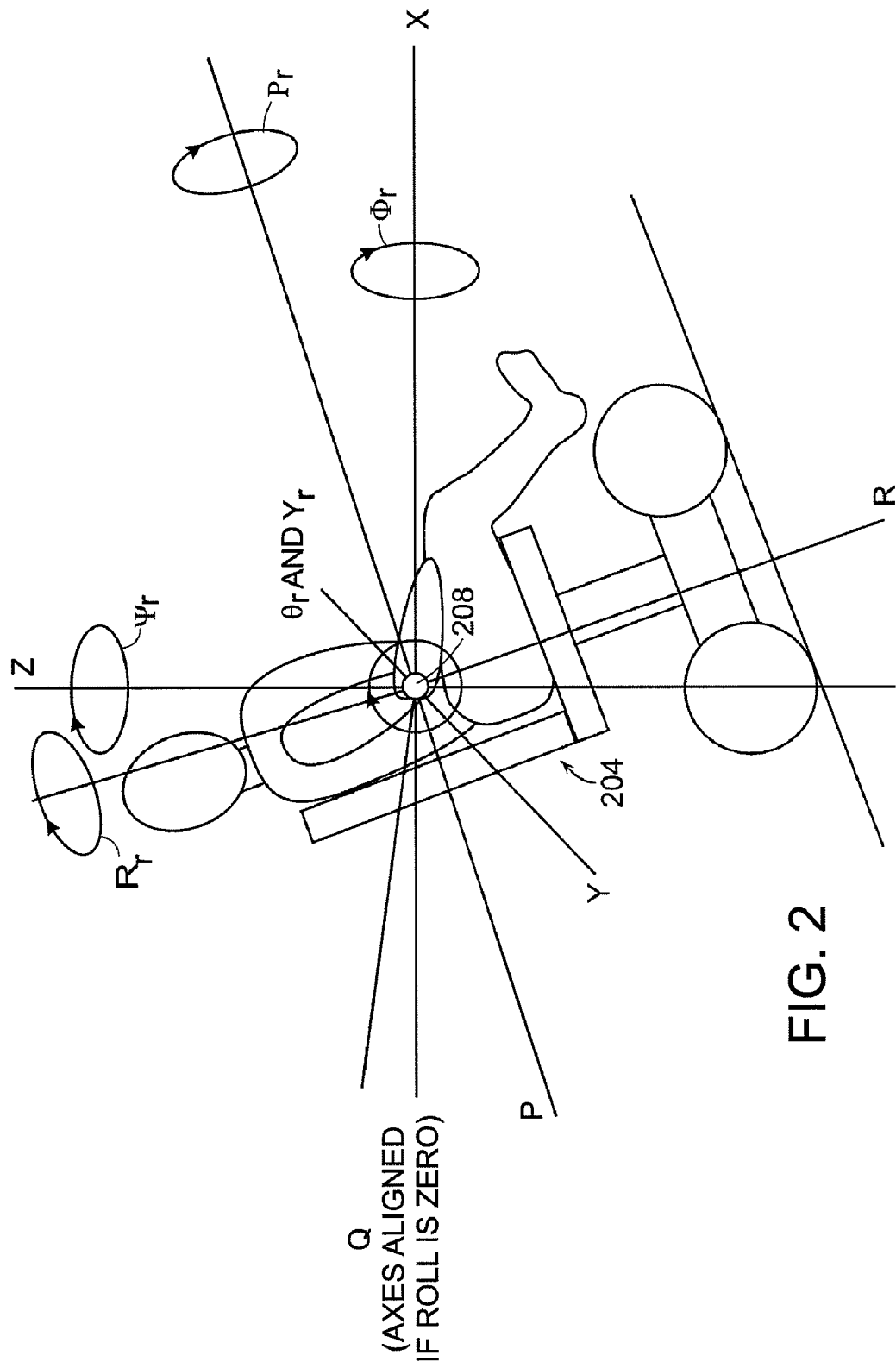
FIG. 2 is a diagram showing a land-based vehicle and corresponding vehicle frame (V-frame) coordinate axes in the presence of a pitch angle along with the Earth frame (E-frame) coordinate axes of the earth.

The E-frame defines the vertical axis, Z, to be co-linear to the direction of gravity and passing through the center of gravity 208 of an occupied vehicle 204 as shown in FIG. 2. The position of the origin of the E-Frame axes about the center of gravity 208 is an arbitrary choice and it should be understood by those skilled in the art that the origin may be positioned about other points on the vehicle 204. The E-frame defines the roll axis, X, as a component in the direction of travel perpendicular to the vertical axis and passing through the center of gravity 208 of the occupied vehicle 204, and the E-frame defines the pitch axis, Y, to be orthogonal to both the Z and X axes and passing through the center of gravity 208 of the occupied vehicle 204. Rotation around the Z axis is described by the angle $\Psi$, also known as the yaw angle. Rotation around the X axis is described by the angle $\Phi$, also known as the roll angle. Rotation around the Y axis is described by the angle $\theta$, also known as the pitch angle.

Figure 3:
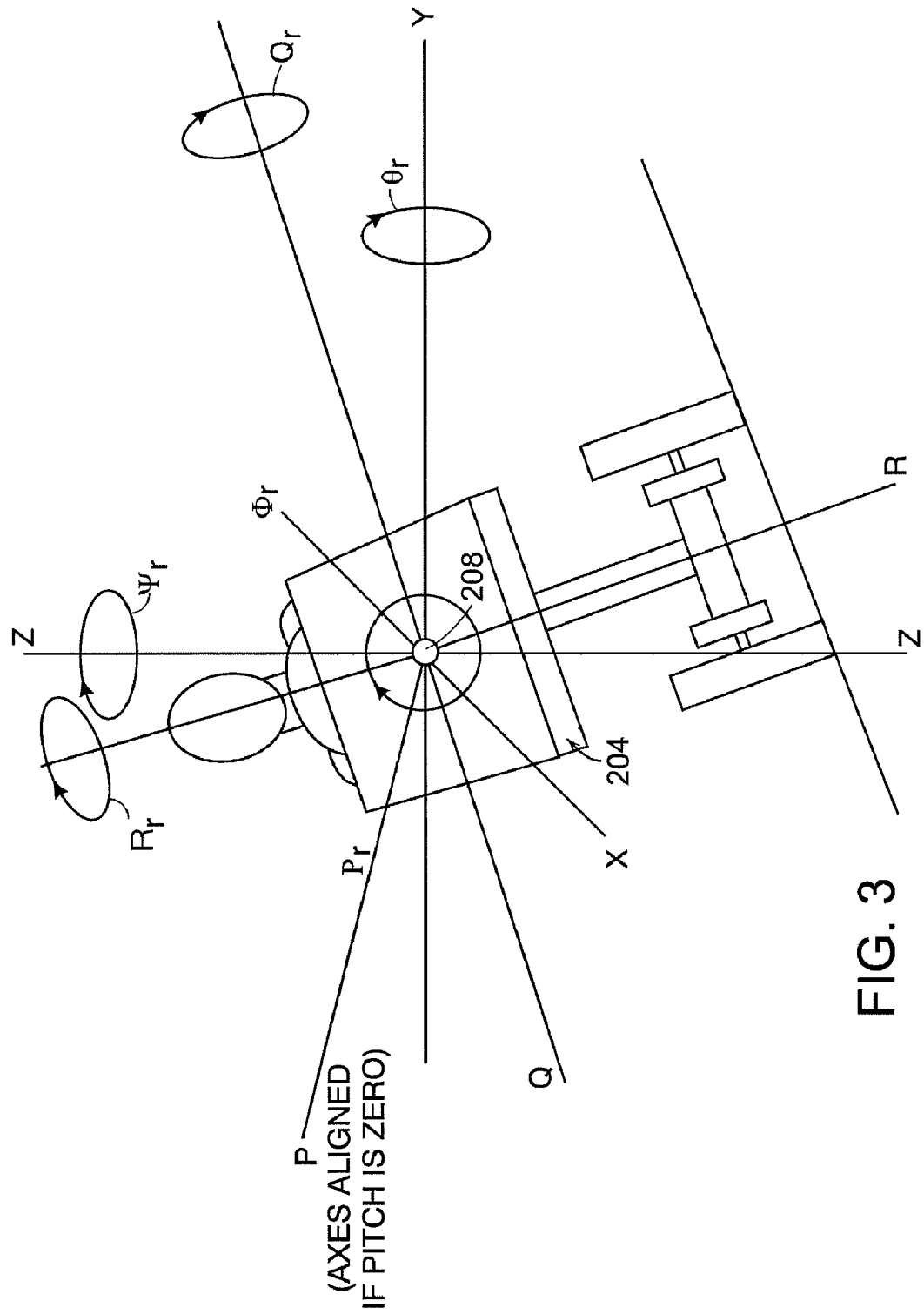
FIG. 3 is a diagram showing the relation of the E-frame to the V-frame when the pitch angle is zero and the roll angle is non-zero.

The axes associated with the V-frame have an origin positioned at the center of gravity 208 of the vehicle 204. In other embodiments, the origin of the axes may be situated at another point on the vehicle 204. The axes are fixed with respect to the vehicle 204. The relative vertical axis, R, is a specified vehicle-fixed substantially vertical axis and may be defined by a line passing through the center of gravity 208 of the vehicle 204 and the support/backrest/head of the operator of the vehicle 204. The relative horizontal axis, P, is perpendicular to the relative vertical axis and has a component parallel to the direction of movement of the vehicle 204. The third axis, Q, is orthogonal to both R and P. The relative orientation of the R, P, Q frame varies with respect to the Z, X, Y frame as the vehicle 204 tilts. As shown in FIG. 2, the Q and Y axes are co-linear, however, R and Z, and X and P are not co-linear, showing that the vehicle is "pitching" and thus it has a non-zero value for $\theta$. FIG. 3 illustrates the vehicle 204 in the presence of a roll angle. The P and X axes are co-linear, however, the R and Z and Q and Y axes are not co-linear. In this configuration, there is a non-zero roll angle, $\Phi$.

The equations below present the rate transformations between the E-frame and V-frame under a small angle approximation for the respective rotation rates, denoted by the subscript r. These transformations will be referred to as small angle Euler transforms (SAETs) and inverse SAETs respectively.

$$\begin{bmatrix} \Phi_r \\ \theta_r \\ \Psi_r \end{bmatrix} \begin{bmatrix} 1 & \theta\Phi & -\theta \\ 0 & 1 & \Phi \\ 0 & -\Phi & 1 \end{bmatrix} \begin{bmatrix} P_r \\ Q_r \\ R_r \end{bmatrix} \quad \text{EQN. 2}$$

$$\begin{bmatrix} P_r \\ Q_r \\ R_r \end{bmatrix} \begin{bmatrix} 1 & 0 & \theta \\ 0 & 1 & -\Phi \\ 0 & \Phi & 1 \end{bmatrix} \begin{bmatrix} \Phi_r \\ \theta_r \\ \Psi_r \end{bmatrix} \quad \text{EQN. 3}$$

Inertial sensors, for example, such as angular rate sensors or rate gyroscopes (hereinafter referred to as gyros) are used to provide pitch state information to the vehicle 204. The inertial sensors measure the rate of change of the orientation of the vehicle 204 about the V-frame and produce a signal which is representative of the rate of change of the pitch, roll, and yaw angles of the vehicle 204. The inertial sensors need to be adjusted regularly due to sensor drift. Thus, tilt sensors are incorporated into the system for providing a stable angular value from which bias errors of the inertial sensors may be compensated, as is discussed with respect to FIG. 6 below. More than one tilt sensor may be used to provide redundancy in the even of one tilt sensor failing. In one embodiment of the invention, the inertial sensors are gyros. In other embodiments, however, the rate sensor may be any other inertial measurement device. A system for accurately measuring the pitch state based in part on the pitch rate signal obtained from the inertial sensors and the pitch signal from a tilt sensor may be calculated using various transformations as described, for example, below.

In addition, U.S. Pat. No. 6,332,103 describes additional methods and apparatus for measuring and/or estimating the pitch state of a vehicle. This patent is incorporated by reference herein in its entirety.

Figure 4:
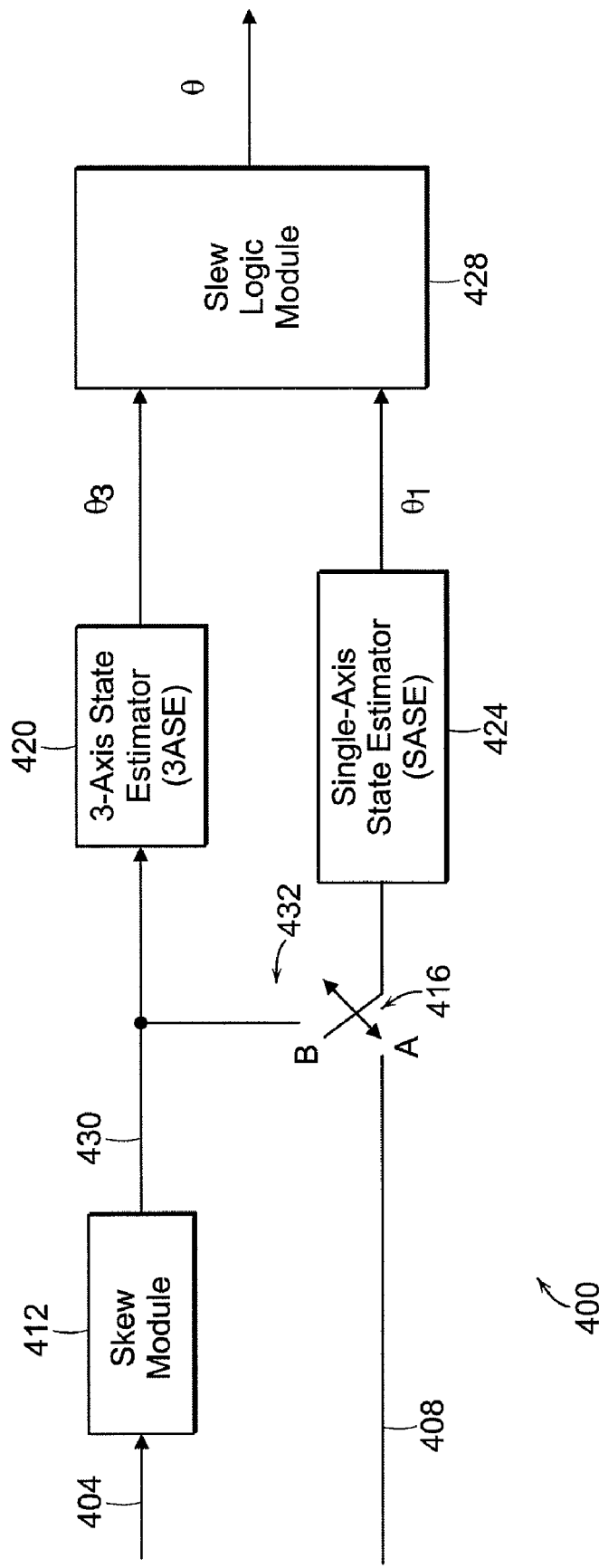
FIG. 4 is a block diagram of a prior art pitch state estimator.

FIG. 4 shows the schematic block diagram 400 for a pitch state estimator used in the prior art. In this embodiment of the invention, signals 404 from four canted inertial sensors (one or more than necessary to provide redundancy) are input to a skew module 412. In this embodiment, the canted inertial sensors are rate gyros. A skew module is a virtual gyro construction module as describe, for example, in FIG. 4 of U.S. Pat. No. 6,332,103. Because the orientation of the inertial sensors (e.g., gyros) may not be aligned with the Q, P and R axes, each signal produced by the inertial sensors may comprise orientation (e.g., rate) information about multiple axes. The skew module 412 transforms the four canted inertial sensor signals 404 to produce three digital 3-axis inertial orientation rates 430 that correspond to the signals that the four canted inertial sensors would produce if oriented to measure the rotation about the P, Q, and R axes. This operation on the four canted inertial sensor signals 404 produces the virtual gyro $Q_r$, $P_r$, and $R_r$ information.

The skew module 412 performs the matrix equation, V=M G where V is the virtual inertial sensor vector, G is the canted inertial sensor output vector, and M is a 3×4 construction matrix that converts the four canted inertial sensor signals in G to the virtual inertial sensor vector, V. The construction matrix M is not unique and can be the inverse least squares solution, or the output of any one of the four combinations of three of the four canted inertial sensors or any combination of the solutions. The coefficients of the construction matrix are determined during the calibration of the vehicle and contain both corrections for the canted inertial sensors alignment and for the individual canted inertial sensor characteristics. In one preferred embodiment, the construction matrix M provides greater fault tolerance for three of the canted inertial sensors through a combination of solutions selected from the least squares solution and the four three canted inertial sensor combinations.

In other embodiments, three or more canted inertial sensors may be used. In order to provide information on the V-Frame orientations, at least three canted inertial sensors are typically required. Additional canted inertial sensors may be used to provide fault-tolerance capability. For example, if one sensor fails the three remaining sensors can still be used to ensure that the vehicle operates properly. Additionally, the inertial sensors may be placed on the principle axis of the vehicle 204. Canting the inertial sensors provides redundancy among the sensors. If one of the canted inertial sensors fails, a value for the rotation about the P, Q and R axes may still be calculated because each sensor measures the P, Q and R components.

The skew module 412 outputs digital 3-axis inertial orientation rates 430 to a 3-axis state estimator 420 (3ASE). The 3-axis state estimator 420 outputs a pitch estimate $\theta_3$ in response to the digital 3-axis inertial orientation rates 430. The operation of the 3-axis state estimator 420 is described further herein with respect to FIG. 6.

The block diagram 400 also includes a switch 416 that has an A position and a B position. When the switch 416 is in the A position, a digital 1-axis inertial orientation rate signal 408 is coupled to a single-axis state estimator 424 (SASE). When the switch 416 is in the B position, the pitch rate component of the digital 3-axis inertial orientation rates 432 is coupled to the single-axis state estimator module 424. The single-axis state estimator 424 outputs a pitch estimate $\theta_1$. The operation of the single-axis state estimator 424 is described further herein with respect to FIG. 6 below. The value of the pitch estimate $\theta_1$ is dependant on the position of the switch 416 and therefore, which input (either the digital 1-axis inertial orientation rate or the pitch rate component of the digital 3-axis inertial orientation rates) is coupled to the input of the single-axis state estimator module 424.

In either switching state (switch 424 set to position A or position B), $\theta_1$ and $\theta_3$ are input to a slew logic module 428. The slew logic module 428 mediates between the inputs ($\theta_1$ or $\theta_3$) to output a pitch estimate $\theta$. The pitch estimate $\theta$ is used in determining torque to be delivered to the wheels to create dynamic stability of the vehicle, for example, the torque T of FIG. 1.

Switching between the pitch rate component of the digital 3-axis orientation rates 432 and the digital 1-axis inertial orientation rate 408 is based on the presence or absence of a fault condition. For example, an out-of range condition of a tilt sensor may trigger switching (by switch 416) of input 432 to the single-axis state estimator module 424. In some embodiments, an error detected in the four canted inertial sensors may trigger the use of input from the digital 1-axis inertial orientation rate signal. Delay associated with convergence of the single-axis state estimator module 424 after switching can cause additional pitch or roll drift.

Figure 5:
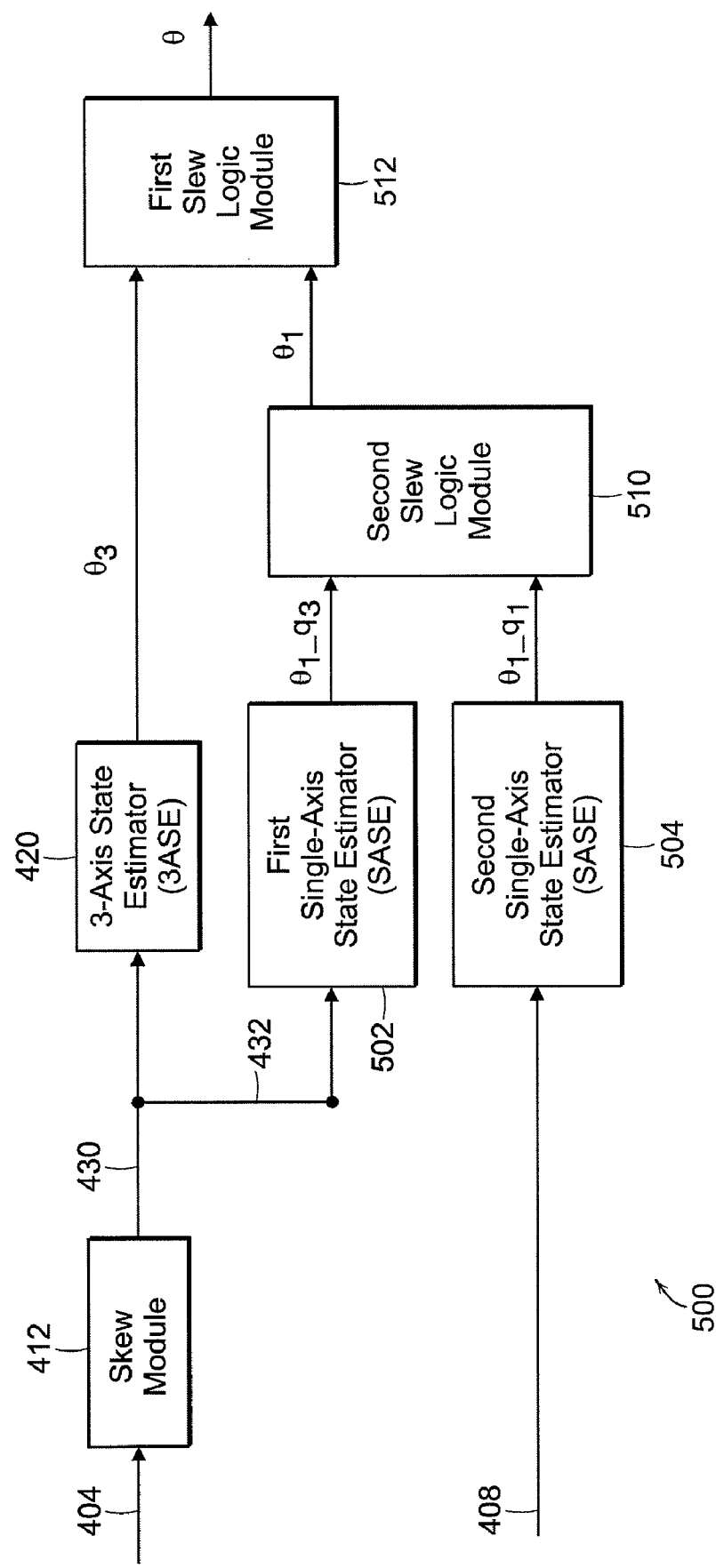
FIG. 5 is a block diagram of a pitch state estimator, according to an illustrative embodiment of the invention.

FIG. 5 shows the schematic block diagram 500 for a pitch state estimator, according to an illustrative embodiment of the invention. Signals 404 from four canted inertial sensors are input to a skew module 412 which outputs digital 3-axis inertial orientation rates 430. In this embodiment of the invention, the digital 3-axis inertial orientation rates 430 are coupled to a 3-axis state estimator 420 (3ASE) and the pitch component of the digital 3-axis inertial orientation rates 432 is coupled to a first single-axis state estimator 502 (SASE). The 3-axis state estimator 420 outputs a pitch estimate $\theta_3$ in response to the digital 3-axis inertial orientation rates. The first single-axis state estimator 502 outputs a first intermediate pitch estimate $\theta_1\_q3$. $\theta_1\_q3$ is equivalent to the pitch estimate $\theta_1$ in FIG. 4 when the switch 416 is in the B position. Additionally, a digital 1-axis inertial orientation rate 408 is coupled to a second single-axis state estimator 504. The second single-axis state estimator 504 outputs a second intermediate pitch estimate $\theta_1\_q1$. $\theta_1\_q1$ is equivalent to the pitch estimation $\theta_1$ in FIG. 4 when the switch 416 is in the A position.

The first intermediate pitch estimate $\theta_1\_q3$ and the second intermediate pitch estimate $\theta_1\_q1$ are coupled to a second slew logic estimator module 510. The second slew logic estimator module 510 mediates between the use of the first intermediate pitch estimate $\theta_1\_q3$ and the second intermediate pitch estimate $\theta_1\_q1$ to output a pitch estimate $\theta_1$. The second slew logic estimator module 510 selects the first or second intermediate pitch estimate ($\theta_1\_q3$ or $\theta_1\_q1$) dependent upon the presence of a fault condition, similarly as described above with the switching of FIG. 4. In this embodiment of the invention, the intermediate pitch estimates $\theta_1\_q1$ and $\theta_1\_q3$ are always readily available. In this manner $\theta_1$ is always readily available, thereby eliminating the convergence delay (which is on the order of seconds) associated with the switching of inputs as described in conjunction with FIG. 4 above. Therefore, in the event of a fault, there will be no discontinuity in the availability of $\theta_1$, which could otherwise affect vehicle performance.

The pitch estimate $\theta_1$ and the pitch estimate $\theta_3$ are inputs to a first slew logic estimator module 512. The first slew logic estimator module 512 mediates between the two inputs $\theta_1$ or $\theta_3$ to arrive at the final pitch estimate $\theta$. A fault or no fault operation may determine which input ($\theta_1$ or $\theta_3$) the slew logic module 512 selects. For example, when the vehicle is started, the first SASE 504 and second SASE 502 are typically ready for use before the 3ASE 420 is available because the single-axis state estimators numerically converge more quickly than the 3-axis state estimator. The slew logic module 512 selects $\theta_1$ until the amount of time it takes the 3ASE 420 to start has passed. Alternatively, if the digital 1-axis inertial orientation rate signal fails to output a measurement the slew logic module 512 selects $\theta_3$ as the pitch estimate $\theta$.

Figure 6:
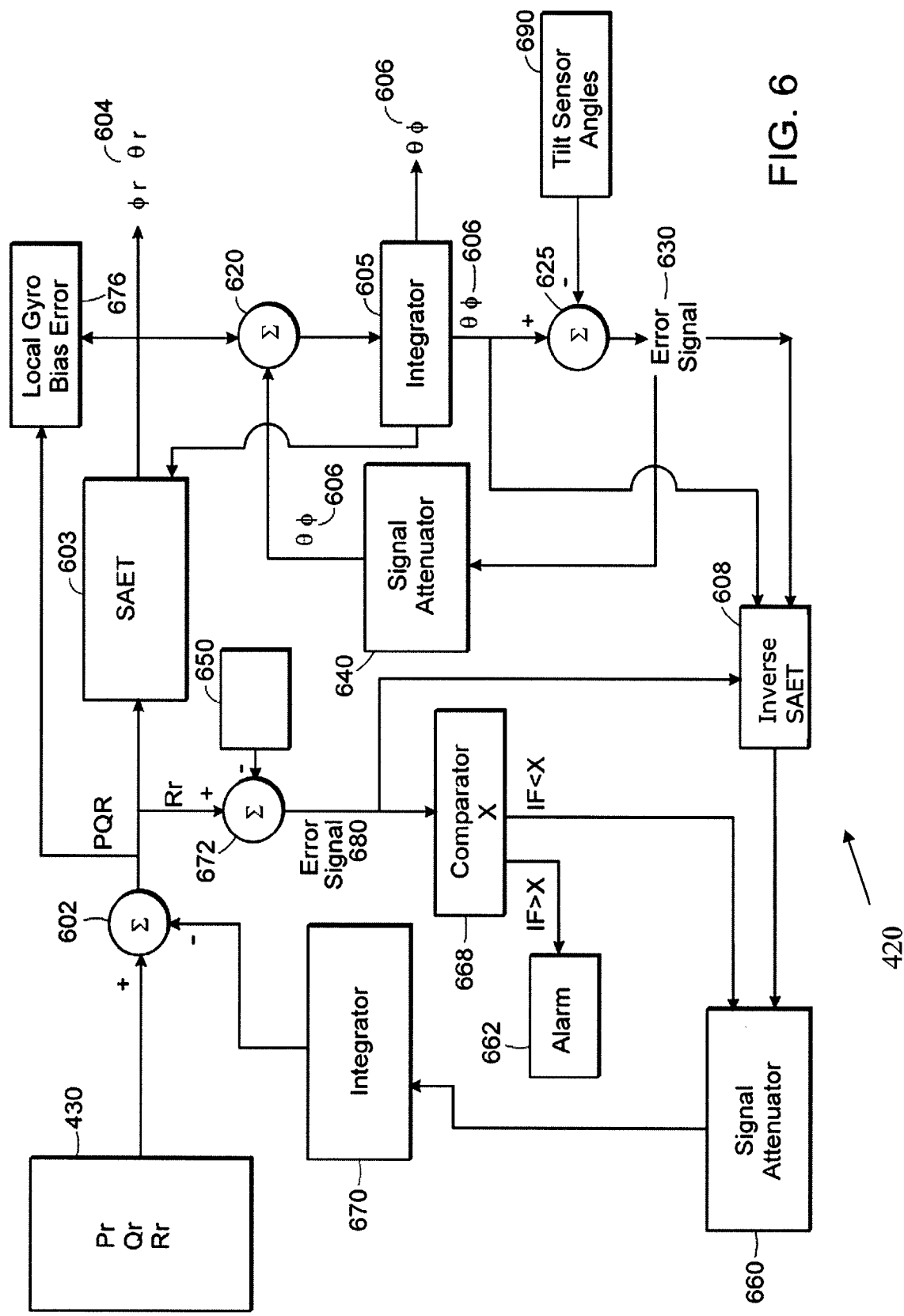
FIG. 6 is a functional block diagram for a three axis state estimator module, according to an illustrative embodiment of the invention.

FIG. 6 shows a functional block diagram of a 3-axis state estimator (e.g., the 3-axis state estimator 420 of FIGS. 4 and 5). The digital 3-axis orientation rates 430, represented by $P_r$, $Q_r$, and $R_r$, output from the skew module 412, are inputs into a summer 602 which corrects for bias errors through a feedback loop. The corrected digital 3-axis orientation rates are coordinate transformed from the V-frame to the E-frame using a small angle Euler transform (SAET) 603, as shown above in EQN. 2, thereby producing the E-frame pitch rate, roll rate, and yaw rate information 604, designated by $\theta_r$, $\Phi_r$, and $\Psi_r$. The pitch rate, $\theta_r$, is provided to the control loop 100 of FIG. 1 of the vehicle 204 of FIG. 2. The E-frame digital 3-axis orientation rates output from the SAET 603 are inputs to summer 620. The output of summer 620 are the inputs to the integration module 605, which integrates the output of the summer 620 to produce the E-frame digital orientation angles pitch angle $\theta$ and roll angle $\Phi$ 606. The pitch angle $\theta$ is input to the control loop 100 of FIG. 1 of the vehicle 204 of FIG. 2. The pitch angle $\theta$ and roll angle $\Phi$ are also inputs into SAET transforms in SAET module 603.

The integration module 605 at summer 625 takes the difference between pitch angle $\theta$ and the pitch angle component of the tilt sensor input 690 and the roll angle $\Phi$ and the roll angle component of a tilt sensor input 690 respectively to generate pitch and roll error signals 630. The pitch and roll angles 690 are provided by tilt sensors, as discussed above with FIG. 4. The error signals 630 are coupled to the inverse Euler transform 608 along with the E-frame orientation angles, pitch angle $\theta$ and roll angle $\Phi$ 606. The pitch and roll error signals 630 are also coupled to a filter 640 which attenuates the signal's strength.

The output of filter 640 is coupled to the summer 620. The feedback loop, 630, 640 and 620, is provided to correct for inaccuracies due to transients, so as to move the output readings of 606 in the direction of the tilt sensors. The attenuation of the signal attenuator 640 is provided to limit a large erroneous absolute reference sensor value from affecting the E-frame orientation angles. A large erroneous absolute reference sensor value may occur, for example, where the vehicle goes over a sudden bump. As the vehicle goes over a bump the absolute reference sensors will produce extraneous signals in the form of transients which inaccurately reflect the pitch rate and the pitch angle.

The inverse SAET 608 performs an inverse SAET on the pitch, roll and yaw error information 630. In this inverse transform the error signals 630 of the pitch and roll are inserted in the inverse equation, as shown in EQN. 3 above, at $\theta_r$, and $\Phi_r$, and the yaw error signal 680 is inserted at $\Psi_r$ where one would expect to find the respective rates. $\Psi_r$ is provided from summer 672 as the difference between roll rate, Rr, and the difference in the velocity of the wheels 650. Performing the inverse SAET on the error signals rather than the rates has the effect of partitioning the error information. The inverse SAET transforms the E-frame signals into the V-frame coordinate system. This signal is then input to an attenuation filter 660. The output of the attenuation filter 660 is input to an integrator 670. The output of integrator 670 is couple to the summer 602. The feedback loop, 672, 608, 660, 670 and 602, accounts for the long term bias drift of the inertial orientation sensors. The attenuation filter 660 allows the tilt sensors, which are more stable than the digital inertial orientation signals, to assist over long periods of time in correcting for the drift of inertial orientation sensors while still allowing the inertial orientation sensor to control short term changes.

Unlike the $P_r$ and $Q_r$ corrections which are proportional to the error signal 680, the yaw rate, $R_r$, correction is performed only up to a preset error level designated as X. The error level correction check is done in comparator 668. If the yaw rate error signal becomes larger than the preset error level X, correction to $R_r$ is suspended under the assumption that the wheels no longer represent the yaw rate and a suspension timer is started. The inertial orientation sensors rate value, $R_r$, is still compared to the change in wheel rate 650 during the suspension to calculate a yaw error signal 680. If after a predetermined amount of time the difference between the value of $R_r$ and that of the delta wheel rate is not below the preset error level, an alarm occurs 662 which in one embodiment is a visual signal. If after a second predetermined time on the suspension timer the difference does not fall below the preset error level, the yaw correction is shut off and an alarm sounds indicating that the system cannot distinguish between a fault and the drift error of the inertial orientation sensors. If the second time limit is reached, the system must be reset. The preset error limit is imposed to prevent erroneous R data from being incorporated into the pitch state estimate when, for example, the vehicle is stationary on a moving platform that is turning.

To provide for accurate readings of the pitch state, upon initialization, the pitch state estimator attempts to align the inertial orientation sensors to the tilt sensor as long as the system is non-accelerated. This is accomplished by adjusting the corner frequencies through the two signal attenuators 640 and 660 to orient the system to the tilt sensors. In an embodiment, this is accomplished by adaptively adjusting the gain in response to an error signal. If during initialization the inertial orientation sensors and the tilt sensors do not align, the system may pause and then re-measure the values for the tilt sensor and inertial orientation signals to see if they have aligned. If they do not align, the system may reverse the process and begin again until alignment is achieved.

A single-axis state estimator (SASE) (for example, as shown in FIG. 5 as estimators 502 and 504) has the same components and filters of the 3-axis state estimator (3ASE) shown in FIG. 6. A distinction is that only the pitch rate $Q_r$ of the digital 3-axis inertial orientation rates 430 is used as input to 602. A further distinction is that in the single-axis state estimator (SASE) the difference in the velocities of the wheels which provides the yaw rate and rate for the 3ASE is used in the SASE only to assist in compensating for misalignment of the inertial orientation signals for the pitch angle. A limiter is placed on this yaw rate to overcome situations where the wheels slip. In the SASE the yaw angle derived from the delta wheel velocities is passed to a summer for removing this component from the calculations. Additionally, a calibration module is added which corrects for misalignment of the inertial orientation signals. Another difference between the 3ASE and the SASE is that the SAET module 603 and inverse SAET 608 are not needed because the system is operating in a single plane as opposed to three dimensions resulting in the SASE assuming that $Q_r=\theta_r$. Additionally, the tilt sensor is only used for the pitch signal.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems.

Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

The described embodiments of the invention are intended to be merely exemplary and numerous variations and modifications will be apparent to those skilled in the art. All such variations and modifications are intended to be within the scope of the present invention as defined in any appended claims.

The invention claimed is:

1. An computerized method for generating a pitch state signal used in control of a ground traversing vehicle, the method being of the type including:

from at least three inertial sensors positioned in three or more non-collinear orientations on the vehicle, deriving three or more digital inertial orientation signals;

calculating a first pitch state signal in a three-axis state estimator module based on the three or more digital inertial orientation signals;

from an additional orientation sensor positioned on the vehicle, deriving an additional digital orientation signal;

calculating a second pitch state signal in a single-axis state estimation based on the digital inertial orientation signals and the additional digital orientation signal;

and using the first and second pitch state signals in a first slew logic estimator module providing a pitch state output signal that mediates between an output from the three-axis state estimator module and the second slew logic estimator module wherein the improvement comprises:

calculating a first intermediate pitch state signal in a first single-axis estimator based on the digital inertial orientation signals;

calculating a second intermediate pitch state signal in a second single-axis state estimator based on the additional digital orientation signal; and using the first and second intermediate pitch state signals in a second slew logic estimator module to provide the second pitch state signal;

so that, in the presence of a fault condition associated with either one or more of the three digital inertial orientation signals or the additional digital orientation signal, the second slew logic estimator module nevertheless provides a single-axis state estimation substantially devoid of discontinuity.

2. The method of claim 1, wherein the step of calculating the first pitch state signal comprises:
   transforming the three or more inertial orientation signals into three axial inertial orientation signals so that each signal corresponds to the orientation of one axis of three perpendicular axes;
   transforming the three axial inertial orientation signals into gravity based orientation signals so that each signal corresponds to a gravity based orientation system;
   transforming the three gravity based orientation signals into three angular signals, one signal representative of the first pitch state signal; and
   providing the first pitch state signal to a control loop of the vehicle for dynamically maintaining stability of the vehicle.

3. The method of claim 1, comprising detecting the presence of a fault condition in response to detecting an error in either at least one of the three or more digital inertial orientation signals or the additional digital orientation signal.

4. The method of claim 3, wherein the second slew logic estimator module provides the second intermediate pitch state signal to the first slew logic estimator module in response to detecting an error in at least one of the three or more digital inertial orientation signals or the second slew logic estimator module provides the first intermediate pitch state signal to the first slew logic estimator module in response to detecting an error in the additional digital orientation signal.

5. The method of claim 4, wherein the first slew logic estimator module provides the second pitch state estimate to a control loop of the vehicle in response to detecting an error in at least one of the three or more digital inertial orientation signals or the first pitch state signal to the control loop of the vehicle in response to detecting an error in the additional digital orientation signal.

6. The method of claim 1, comprising determining if a fault condition is present comprising,
   calculating a pitch rate error by passing output signals from the at least three inertial sensors through filters that are configured such that the sum of the output of the filters equals zero when the inertial sensors are operating with no error; and
   summing outputs of the filters; and
   comparing the sum of the output of the filters to a predefined threshold value determining if a fault condition is present.

7. The method of claim 6, comprising:
   calculating a pitch angle error by passing the summed output of the filters through an additional summer; and
   integrating the output of the additional summer to produce a pitch angle error; and
   comparing the pitch angle error to a predefined threshold value determining if a fault condition that cannot be corrected has occurred.

8. The method according to claim 7, wherein the pitch angle error detected in the inertial measurement sensor is corrected by using the pitch angle error as feedback in a pitch state estimator.

9. An improved apparatus for generating a pitch state signal used in control of a ground-traversing vehicle, the apparatus being of the type including at least three inertial sensors positioned in three or more non-collinear orientations on the vehicle, having outputs by which may be derived three or more digital inertial orientation signals;
a three-axis state estimator module, having an input coupled to the three or more digital inertial orientation signals, for calculating a first pitch state signal;
an additional orientation sensor, positioned on the vehicle, having an output by which may be derived an additional digital orientation signal;
logic for performing a single-axis state estimation of a second pitch state signal based on the digital inertial orientation signals and the additional digital orientation signal; and
a first slew logic estimator module, having an input coupled to the first and second pitch state signals, for providing a pitch state output signal, the first slew logic module mediating between an output from the three-state estimator module and a second slew logic estimator module wherein the improvement comprises:
a first single-axis state estimator module, having an input coupled to the three or more digital inertial orientation signals for calculating a first intermediate pitch state signal;
a second single-axis state estimator module having an input coupled to the additional digital orientation signal, for calculating a second intermediate pitch state signal; and
the second slew logic estimator module, having an input coupled to the first and second intermediate pitch state signals, and an output coupled to an input of the first slew logic estimator module,
so that, in the presence of a fault condition associated with either one or more of the three digital inertial orientation signals or the additional digital orientation signal, the second slew logic estimator module nevertheless provides a single-axis state estimation substantially devoid of discontinuity.

10. The apparatus according to claim 9, wherein at least one inertial sensor is a gyroscope.

11. The apparatus according to claim 9, wherein the at least three inertial reference sensors are at least three gyroscopes.

12. The apparatus according to claim 11, comprising a virtual-gyro construction module for receiving the three or more digital inertial orientation signals of the at least three gyroscopes and outputting to a state estimator module three rotation rate signals, wherein each rotation rate signal represents a rotation rate about one axis of three perpendicular axes.

13. The apparatus according to claim 9, comprising:
   a fault detection module for detecting the presence of erroneous inertial orientation signals produced by at least one of the inertial sensors.

14. An computerized method for generating an orientation signal used in control of a ground traversing vehicle, the method being of the type including:
   from at least three inertial sensors positioned in three or more non-collinear orientations on the vehicle, deriving three or more digital inertial orientation signals;
   calculating a first orientation signal in a three-axis state estimator module based on the three or more digital inertial orientation signals;
   from an additional orientation sensor positioned on the vehicle, deriving an additional digital orientation signal;
   calculating a second orientation signal in a single-axis state estimation based on the digital inertial orientation signals and the additional digital orientation signal;
   and using the first and second orientation signals in a first slew logic estimator module providing an orientation output signal that mediates between an output from the three-axis state estimator module and the single-axis state estimation; wherein the improvement comprises:

calculating a first intermediate orientation signal in a first single-axis estimator based on the digital inertial orientation signals;

calculating a second intermediate orientation signal in a second single-axis state estimator based on the additional digital orientation signal; and using the first and second intermediate orientation signals in a second slew logic estimator module to provide the second orientation signal;

so that, in the presence of a fault condition associated with either one or more of the three digital inertial orientation signals or the additional digital orientation signal, the second slew logic estimator module nevertheless provides a single-axis state estimation substantially devoid of discontinuity.

15. The method of claim 14, wherein the first and second orientation signals are pitch state signals, roll state signals or yaw state signals.

* * * * *